(12) United States Patent
Weissman

(10) Patent No.: US 7,569,512 B2
(45) Date of Patent: Aug. 4, 2009

(54) ZIRCONIA SUPPORT AND ZIRCONIA SUPPORTED CATALYST

(75) Inventor: Jeffrey G. Weissman, Broken Arrow, OK (US)

(73) Assignee: Umicore AG & Co. KG, Hanau (DE)

( * ) Notice: Subject to any disclaimer, the term of this patent is extended or adjusted under 35 U.S.C. 154(b) by 764 days.

(21) Appl. No.: 10/985,878

(22) Filed: Nov. 10, 2004

(65) Prior Publication Data

US 2006/0100099 A1 May 11, 2006

(51) Int. Cl.
*B01J 23/00* (2006.01)

(52) U.S. Cl. .................... 502/325; 502/349

(58) Field of Classification Search ......... 502/300–326, 502/349
See application file for complete search history.

(56) References Cited

U.S. PATENT DOCUMENTS

| | | | | |
|---|---|---|---|---|
| 3,513,109 | A | * 5/1970 | Stiles | 502/241 |
| 4,087,259 | A | 5/1978 | Fujitani et al. | 48/212 |
| 5,075,277 | A | 12/1991 | Saiai et al. | 502/333 |
| 5,130,114 | A | 7/1992 | Igarashi | 423/652 |
| 5,139,992 | A | * 8/1992 | Tauster et al. | 502/304 |
| 5,744,419 | A | 4/1998 | Choudhary et al. | 502/326 |
| 6,034,029 | A | * 3/2000 | Wulff-Doring et al. | 502/308 |
| 6,110,861 | A | 8/2000 | Krumpelt et al. | 502/326 |
| 6,429,167 | B1 | * 8/2002 | Maeno et al. | 502/325 |
| 6,702,960 | B1 | 3/2004 | Schaddenhorst et al. | 252/373 |

| | | | |
|---|---|---|---|
| 2002/0139112 | A1 | 10/2002 | Onodera et al. ............... 60/286 |

FOREIGN PATENT DOCUMENTS

| | | |
|---|---|---|
| EP | 0 303 438 A2 | 2/1989 |
| EP | 0 333 037 B1 | 9/1989 |
| EP | 0 414 573 B1 | 2/1994 |
| WO | WO 02/20395 | 3/2002 |
| WO | WO 02/47805 A2 | 6/2002 |

OTHER PUBLICATIONS

Kaddouri et al. "On the Activity of $ZrO_2$ Prepared by Different Methods", Journal of Thermal Analysis, vol. 53 (1998) 97-109.*

Mazzocchia et al. "Hydrogenation of CO over $ZrO_2$-Supported Rh Catalysts: Role of Experimental Parameters in Modifying the $C_2H_5OH/CH_4$ Product Ratio," Journal of Catalysis 111, 345-352 (1988).*

Carbon dioxide reforming of methane to synthesis gas over supported rhodium catalysts: the effect of support; Ruckenstein, E.; Wang, H. Y.; Applied Catalysis A: General 204, (1) 2000; Nov. 6, 2000 pp. 143-152; Abstract Only; 1 page.

(Continued)

*Primary Examiner*—Steven Bos
*Assistant Examiner*—Anthony J Zimmer
(74) *Attorney, Agent, or Firm*—Robert G. Weilacher; Smith, Gambrell & Russell

(57) ABSTRACT

A catalyst can comprise rhodium and zirconia. The zirconia can have a morphology parameter of greater than or equal to about 800. The method for making the catalyst can comprise: combining rhodium and a zirconium compound, wherein the zirconium compound has a morphology parameter of greater than or equal to about 800, to form a mixture, and disposing the mixture onto a substrate.

8 Claims, 4 Drawing Sheets

OTHER PUBLICATIONS

CO sub 2 reforming of CH sub 4 over supported Ru catalysts; Bradford, M. C. J.; Vannice, M. A.; Journal of Catalysis vol. 183 No. 1 Apr. 1, 1999 pp. 69-75; Abstract Only, 1 page.

The development of platinum-zirconia catalysts for the carbon dioxide reforming of methane; Van Keulen, A. N. J.; Book ISBN—90-900-9877-1; 1996 126 page(s); Abstract Only; 1 page.

Effect of promotion with Sn on supported Pt catalysts for CO sub 2 reforming of CH sub 4; Stagg, S. M.; Romeo, E.; Padro, C.; Resasco, D. E.; Journal of Catalysis vol. 178 No. 1 Aug. 15, 1998 pp. 137-145; Abstract Only; 1 page.

Syngas production from natural gas using ZrO sub 2 -supported metals; Hegarty, M. E. S.; O'Connor, A. M.; Ross, J. R. H.; Catalysis Today vol. 42 No. 3 Jul. 9, 1998 pp. 225-232; Abstract Only; 1 page.

Role of support in CO sub 2 reforming of CH sub 4 to syngas over Ni catalysts; Ruckenstein, E.; Hu, Yun Hang; Journal of Catalysis vol. 162 No. 2 Sep. 1, 1996 pp. 230-238; Abstract Only; 1 page.

Design of stable catalysts for methane-carbon dioxide reforming; Lercher, J. A.; Bitter, J. H.; Hally, W.; Niessen, W.; Book Analytic; 11th International congress on catalysis; 1996 pp. 463-472; Abstract Only; 1 page.

Reforming of methane with carbon dioxide to synthesis gas over supported rhodium catalysts: I. Effects of support and metal crystallite size on reaction activity and deactivation characteristics; Zhang, Z. L.; Tsipouriari, V. A.; Efstathiou, A. M.; Journal of Catalysis vol. 158 No. 1 Jan. 1996 pp. 51-63; Abstract Only; 1 page.

Reforming of methane with carbon dioxide to synthesize gas over supported rhodium catalysts: II. A steady-state tracing analysis: Mechanistic aspects of the carbon and oxygen reaction pathways to form CO; Efstathiou, A. M.; Kladi, A.; Tsipouriari, V. A.; Journal of Catalysis vol. 158 No. 1 Jan. 1996 pp. 64-75; Abstract Only; 1 page.

Reaction performance of methane reforming with steam over supported Ni, Ru and Rh catalysts; Kasaoka, S.; Sasaoka, E.; Hanaya, M.; Kagaku Kogaku Ronbunshu; vol. 16 No. 5 Sep. 10, 1990 pp. 1094-1100; Abstract Only; 1 page.

Methane activation and reaction on supported and unsupported nickel catalysts; Bartholomew, C. H.; Hsieh, Huo-Yen; Book Analytic; The 1989 international chemical congress of Pacific Basin Societies: Abstracts of papers, Parts I and II; 1989 pp. 331; Abstract Only; 1 page.

Catalysts for continuous methane reforming in medium temperature SOFC; Vernoux, P.; Guindet, J.; Gehain, E.; Kleitz, M. Editor—Stimming, U.; Singhal, S. C.; Tagawa, H.; Lehnert, W.; Proceedings of the Fifth International Symposium on Solid Oxide Fuel Cells (SOFC-V) 1997 pp. 219-227; Abstract Only; 1 page.

Autothermal reforming catalyst development for fuel cell applications; Wagner, A. L., (Sud-Chemie Inc.); Wagner, J. P., (Sud-Chemie Inc.); Krause, T. R., (Argonne National Laboratory); Carter, J. D., (Argonne National Laboratory); Technical Papers; Society of Automotive Engineers, Inc.; Conference Date—Jun. 3, 2002-Jun. 5, 2002 Conference Title—Future Car Congress Conference Location—Arlington, Virginia; Abstract Only; 1 page.

The Effect of Ceramic Supports on Partial Oxidation of Hydrocarbons over Noble Metal Coated Monoliths; A.S. Bodke, et al.; Journal of Catalysts 179, Article No. CA982224; pp. 138-149 (1998).

\* cited by examiner

ZIRCONIA SUPPORT AND ZIRCONIA SUPPORTED CATALYST

BACKGROUND

Stabilized zirconia (i.e., stabilized zirconium oxide), e.g., yttria stabilized zirconia and lanthana stabilized zirconia, is commonly employed as a catalyst support, particularly for partial oxidation fuel reforming. Generally, rhodium supported stabilized tetragonal zirconia's are exclusively preferred.

The tetragonal stabilized zirconia is typically used to form a washcoat for supporting catalytic active metals or metal oxides. This washcoat has been used to increase dispersion of the active ingredients, and therefore to increase their utilization and stability. The washcoat is placed onto a substrate, such as a monolith, foam, or the like, which is then disposed in a housing.

Partial oxidation fuel reforming reactions typically proceed at very high temperatures, usually in excess of 1,000° C. The highest temperatures (even exceeding 1,100° C.) can be reached due to heat released during transient operations, system upsets, or deliberately when high flow rates are required, or when operating in a mode where heat lost via conduction, radiation, or convection, is less than the amount of heat generated by the reaction. Under these circumstances, typical washcoat materials (e.g., tetragonal stabilized zirconia) tend to fail. The failure modes involve one or more of melting, recrystallization, sintering, collapse of pore structure, loss of surface area, etc. In all of these cases, changes to the washcoat result in a reduction of the amount of active ingredients available for the reaction, thus reducing the effectiveness of the catalyst. Thus there is a need to provide a more stable washcoat material.

SUMMARY

Disclosed herein are zirconia supports, zirconia supported catalysts, and methods of making catalysts. In one embodiment, a catalyst can comprise rhodium and zirconia. The zirconia can have a morphology parameter of greater than or equal to about 800.

In one embodiment, the method for making the catalyst can comprise: combining rhodium and a zirconium compound, wherein the zirconium compound has a morphology parameter of greater than or equal to about 800, to form a mixture, and disposing the mixture onto a substrate.

The above-described and other features will be appreciated and understood by those skilled in the art from the following detailed description, drawings, and appended claims.

BRIEF DESCRIPTION OF THE DRAWINGS

Refer now to the figures, which are meant to be exemplary, not limiting.

DETAILED DESCRIPTION

Figure 1:
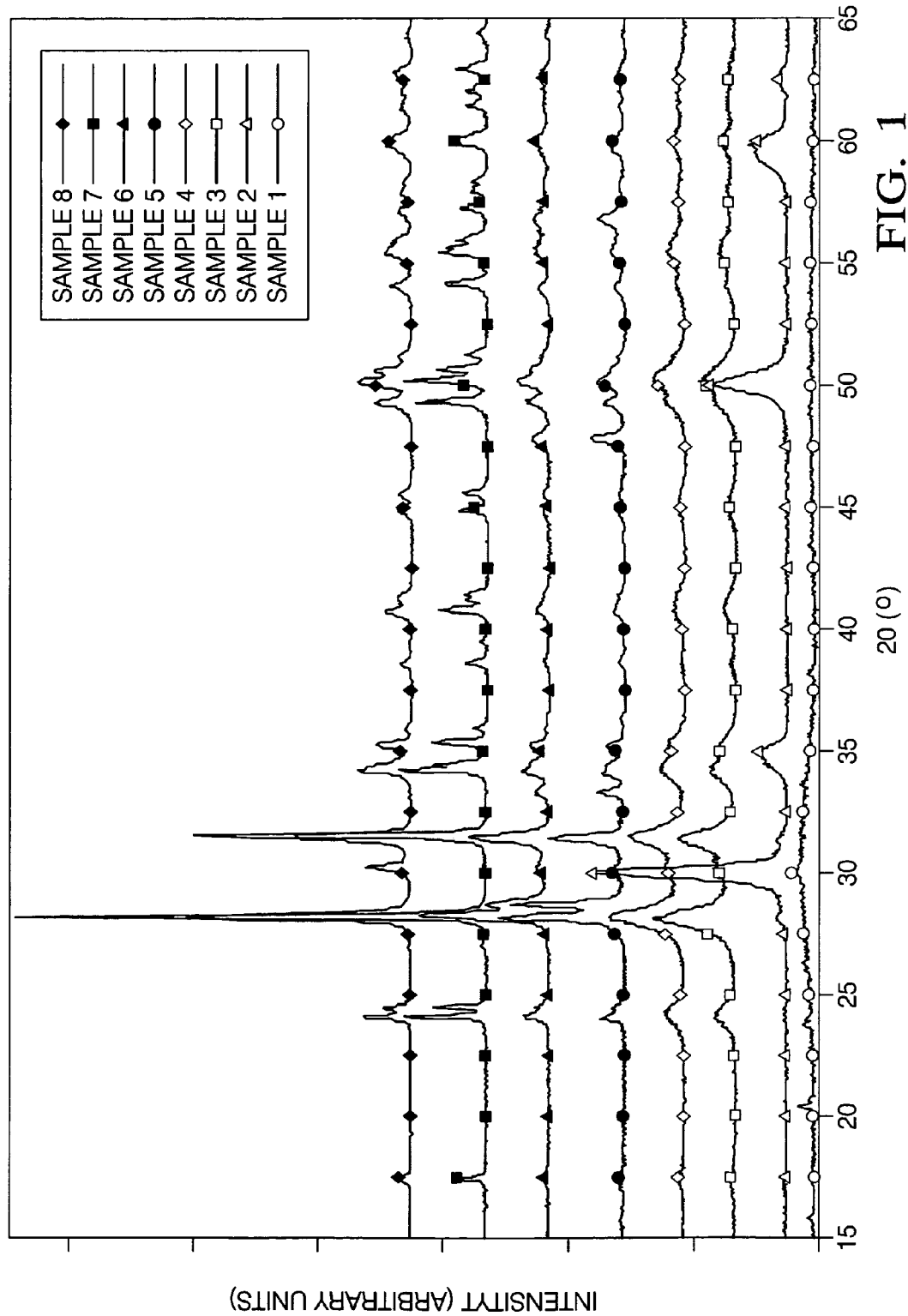
FIG. 1 is a graphical representation of X-ray diffraction patterns for the materials set forth in Table 1.
Figure 2:
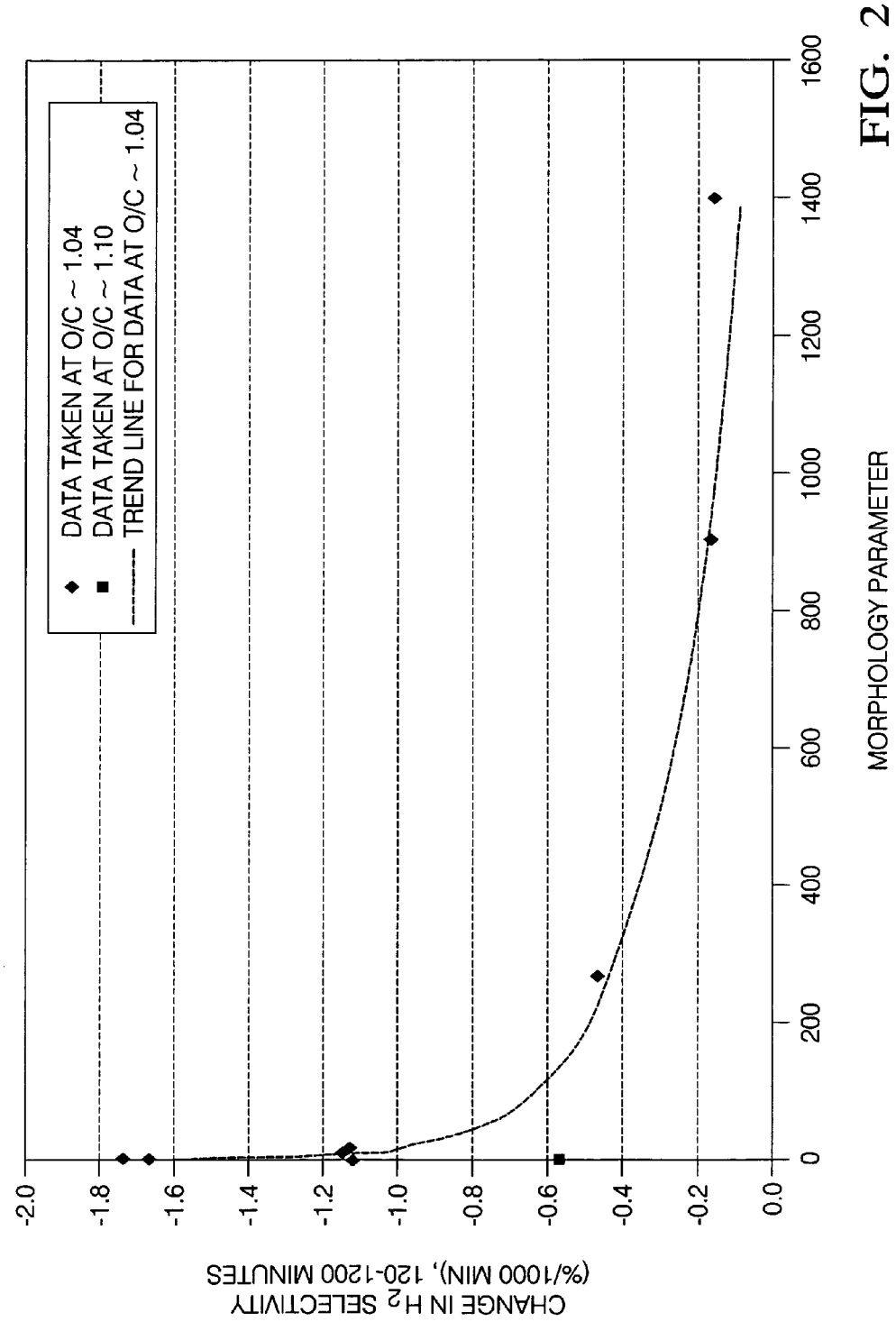
FIG. 2 is a graphical representation of catalyst performance over a period of time.
Figure 3:
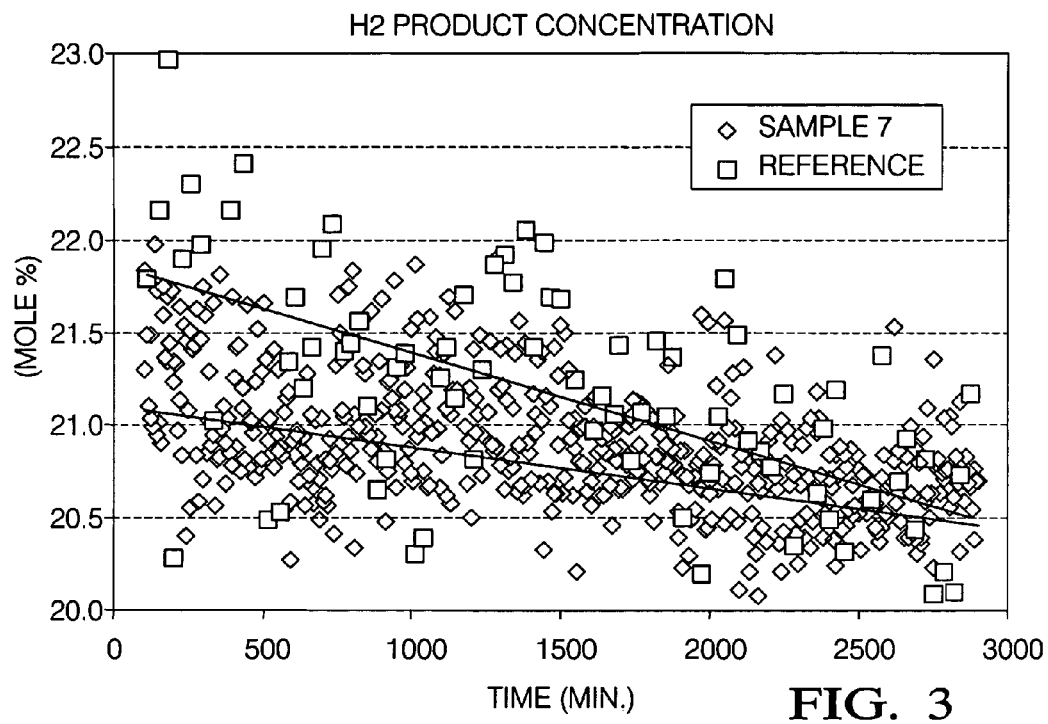
FIG. 3 is a graphical representation of performance comparison for a monoclinic phase zirconia versus an alpha aluminum oxide, with respect to hydrogen concentration.
Figure 4:
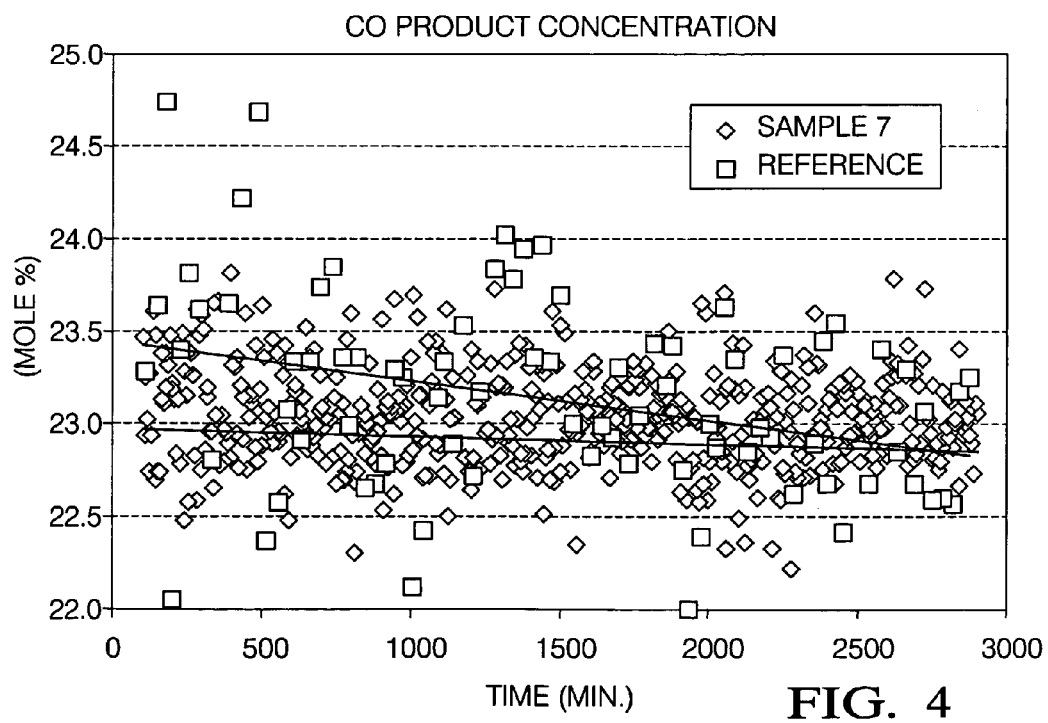
FIG. 4 is a graphical representation of performance comparison for a monoclinic phase zirconia versus an alpha aluminum oxide, with respect to carbon monoxide concentration.
Figure 5:
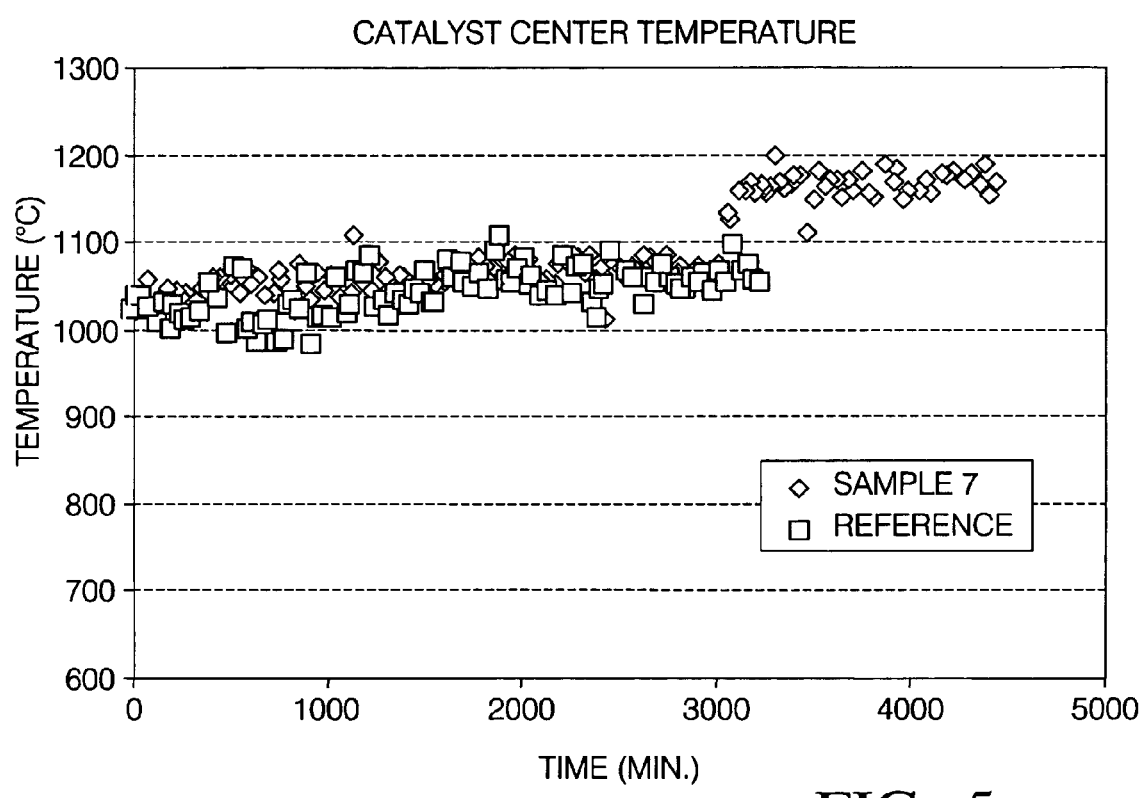
FIG. 5 is a graphical representation of zirconia and aluminum oxide based washcoat testing comparing catalyst center temperature versus time.

It is noted that the terms "first," "second," and the like, herein do not denote any amount, order, or importance, but rather are used to distinguish one element from another, and the terms "a" and "an" herein do not denote a limitation of quantity, but rather denote the presence of at least one of the referenced item. Additionally, all ranges disclosed herein are inclusive and combinable (e.g., the ranges of "up to 25 wt %, with 5 wt % to 20 wt % desired," are inclusive of the endpoints and all intermediate values of the ranges of "5 wt % to 25 wt %," etc.). The modifier "about" used in connection with a quantity is inclusive of the stated value and has the meaning dictated by the context (e.g., includes the degree of error associated with measurement of the particular quantity). The notation "±10%" means that the indicated measurement may be from an amount that is minus 10% to an amount that is plus 10% of the stated value.

Several factors affect active, stable zirconia washcoat based reforming catalysts, including: surface area, crystal structure, and purity. With respect to the surface area, unlike alumina (i.e., aluminum oxide) washcoats, zirconia (i.e., zirconium oxide) washcoats exhibit kinetic limitations. Therefore, although increased surface area can improve performance, higher surface areas also lead to increased instability. For the crystal structure, when regarding performance, it has been discovered that the tetragonal phase zirconia is significantly less stable than monoclinic phase zirconia.

It has unexpectedly been discovered that, even with high surface area, poor performance and degradation can occur. Catalyst performance and life is associated with a morphology parameter:

$$\text{Morphology Parameter} = (\text{surface area}) \times (\text{phase ratio})$$

$$\text{Phase Ratio} = M/T$$

M represents the amount of monoclinic phase zirconia by weight, while T is the amount of tetragonal phase zirconia by weight. Therefore, with a morphology parameter of greater than or equal to about 800, or, more specifically, greater than or equal to about 900, or, even more specifically, greater than or equal to about 1,100, the catalyst better retains the hydrogen selectivity over time.

The amount of monoclinic ("baddeleyite") phase zirconia ($ZrO_2$), compared to tetragonal phase zirconia, as determined by X-ray diffraction (XRD) at room temperature (e.g., about 25° C.), can be greater than or equal to about 8 times more monoclinic than tetragonal phase (e.g., M divided by T=greater than or equal to 8), or, more specifically, greater than or equal to about 10 times more monoclinic (M) than tetragonal (T) phase, or, even more specifically, greater than or equal to about 12 times more monoclinic than tetragonal phase. Additionally, the surface area of the zirconia can be greater than or equal to about 10 square meters per gram ($m^2/g$), or, more specifically, to greater than or equal to about 25 $m^2/g$, or, even more specifically, to greater than or equal to about 50 $m^2/g$, and, yet even more specifically, to greater than or equal to about 75 $m^2/g$, as measured on powders prior to forming a washcoat.

During use, the zirconia can be exposed to air and gasoline (reactants), for example. The reactants (air plus fuel) can have an oxygen to carbon (O/C) ratio of greater than or equal to about 0.95, or, more specifically, an O/C of about 0.95 to about 1.30, or even more specifically, an O/C of about 1.04 to about 1.15, wherein O is the molar amount of oxygen derived from oxygen contained in the reactants (including any carbon monoxide (CO), carbon dioxide ($CO_2$) or water ($H_2O$) which may be present), and C is the molar amount of carbon derived from hydrocarbons (e.g., $CH_4$), CO, and $CO_2$, contained in the reactants. The total amount of O and C contained in the reactants can be measured by various techniques, such as gas chromatography, mass spectrometry, chemical analysis, and the like, performed on either the reactants individually or as a mixture, or alternatively, performed on the total product or the reaction.

Although various operating temperatures can be employed, zirconia having the desired morphology parameter has been found to be particularly useful at operating temperatures of greater than or equal to about 900° C., or more specifically, greater than or equal to about 1,000° C.

The zirconia can be a support for an active (catalytic) material. The type of active material is dependent upon the type of device in which the catalyst will be employed. For a reformer and a partial oxidation reaction, the catalytic material can comprise rhodium in combination with platinum, palladium, iridium, osmium, ruthenium, tantalum, zirconium, yttrium, cerium, nickel, manganese, copper, and the like, as well as oxides, alloys, and combinations comprising at least one of the foregoing catalytic materials. In one embodiment, the catalyst can comprise rhodium, platinum, and/or nickel, in various combinations or situated in separate layers, or, more specifically, an outer layer of the support can comprise rhodium (e.g., no rhodium is added to any other layer on the support. Optionally, other catalytic materials are not added to this outerlayer.)

Catalyst loadings are expressed in terms of concentration of active (catalytic) metal in the support, and concentration of active (catalytic) metal on a substrate, if employed. For example concentrations of catalytic metal in the support can be about 0.1 to about 10 wt %, or, more specifically, about 1 wt % to about 5 wt %, or, even more specifically, about 2 wt % to about 5 wt %. Loadings on a substrate can be from about 10 to about 1,000 grams per cubic foot of substrate ($g/ft^3$), or, more specifically, about 25 to about 500 $g/ft^3$, or, even more specifically, about 59 to about 121 $g/ft^3$. The catalytic material can be supported on the zirconia and disposed on and/or throughout (hereinafter collectively referred to as "on") a substrate, e.g., wash coated, imbibed, impregnated, physisorbed, chemisorbed, precipitated, or otherwise applied to the substrate.

The catalytic material(s) can be combined with additional material(s) and disposed on the zirconia, or the catalytic material and additional material(s) can be sequentially disposed on the zirconia. The additional materials can include alkali metals, alkaline earth metals, Group II metals, rare earth metals, Group VIII metals, and the like, as well as, oxides, alloys, and combinations comprising at least one of the foregoing. Materials added to improve usability of the support (i.e., during washcoating onto a substrate), to improve adhesion onto a support, and/or to act as a co-catalyst and/or activity enhancer for the active metal. Some possible materials can include barium, (e.g., added as BaO, $BaCO_3$, $BaSO_4$, organometallic compounds of Ba, and/or the like), alumina oxides, aluminum nitrate, and the like, and combinations comprising at least one of the foregoing.

The catalyst material(s) can be disposed on the zirconia by combining the zirconia with the catalyst material(s) to form a mixture, drying, and optionally calcining. More specifically, a slurry can be formed by combining zirconia powder and water, and optionally pH control agents (such as inorganic or organic acids and bases) and/or other components. The catalytic material(s) (e.g., catalytic metals, such as Rh), can be added as salt(s) (e.g., inorganic salt(s) and/or organic salt(s); such as rhodium nitrate solution). This slurry can then be washcoated onto a suitable substrate. The washcoated product can be dried and heat treated to fix the washcoat onto the substrate. The heat treatment can be at temperatures of about 90° C. to about 700° C., or more specifically, (e.g., for a final heat treatment step) a heat treatment temperature of about 450° C. to about 600° C. For example, between each coating pass, the coated substrate can be heat treated (e.g., in air) treating at about 75° C. to about 230° C. for about 10 to about 180 minutes, and at about 500° C. to about 600° C. for about 45 minutes to about 90 minutes. More specifically, the heat treatment can be at about 75° C. to about 100° C. for about 10 minutes to about 60 minutes, then at about 110° C. to about 130° C. for about 10 minutes to about 60 minutes, followed by about 175° C. to about 220° C. for about 30 minutes to about 60 minutes, and finally at about 500° C. to about 600° C. for about 45 minutes to about 90 minutes.

This slurry can be dried and heat treated, e.g., at temperatures of about 90° C. to about 1,400° C., or, more specifically, about 900° C. to about 1,250° C., and, even more specifically, at 1,200° C.±50° C., e.g., to adjust the surface area and crystalline nature of the support. After this heat treatment, the resultant material can be reformed into a slurry and washcoated onto a substrate, as described previously. Alternatively, or in addition, the slurry can be washcoated onto the substrate and then heat treated as described, to adjust the surface area and crystalline nature of the support. Once the support has been heat treated, catalyst metals can be disposed on the support. The catalyst metals, therefore, can be added after the washcoat is fixed onto the substrate by additional washcoat steps and/or by exposing the washcoated substrate to a liquid containing the catalytic metal.

The supported catalyst can be disposed on a substrate. The substrate can comprise any material designed for use in the desired environment, e.g., solid oxide fuel cell, a spark ignition and/or diesel engine environment. Some possible materials include cordierite, silicon carbide, metal, metal oxides (e.g., alumina, and the like), glasses, and the like, and mixtures comprising at least one of the foregoing materials. These materials can be in the form of packing material (e.g., saddles, rings, pellets, particles, extrudates (e.g., cylindrical, shaped, with lobes, and the like), foils, perform, mat, fibrous material, monoliths (e.g., a honeycomb structure, and the like), other porous structures (e.g., porous glasses, sponges), foams, molecular sieves, and the like (depending upon the particular device), and combinations comprising at least one of the foregoing materials and forms, e.g., metallic foils, open pore alumina sponges, and porous ultra-low expansion glasses. Furthermore, these substrates can be coated with oxides and/or hexaaluminates, such as stainless steel foil coated with a hexaaluminate scale.

Although the substrate can have any size or geometry, the size and geometry are preferably chosen to optimize surface area in the given exhaust emission control device design parameters. Typically, the substrate has a honeycomb geometry, with the combs through-channel having any multi-sided or rounded shape, with substantially square, triangular, pentagonal, hexagonal, heptagonal, or octagonal or similar geometries preferred due to ease of manufacturing and increased surface area.

Once the supported catalytic material is on the substrate, the substrate can be disposed in a housing to form the reformer. The housing can have any design and comprise any material suitable for the application. Suitable materials for the housing can comprise metals, alloys, and the like, such as ferritic stainless steels (including stainless steels such as, e.g., the 400—Series such as SS-409, SS-439, and SS-441), and other alloys (such as those containing nickel (Ni), chromium (Cr), aluminum (Al), yttrium (Y), and the like, e.g., to permit increased stability and/or corrosion resistance at operating temperatures or under oxidizing or reducing atmospheres).

Also similar materials as the housing, end cone(s), end plate(s), exhaust manifold cover(s), and the like, can be concentrically fitted about the one or both ends and secured to the housing to provide a gas tight seal. These components can be formed separately (e.g., molded or the like), or can be formed integrally with the housing using a methods such as, e.g., a spin forming, or the like.

The following examples are intended to be illustrative, not limiting.

EXAMPLES

Table 1 sets for the composition of the various Samples tested. Samples 1-3, 6 used a zirconium hydroxide powder containing about 6 wt % lanthinum oxide ($La_2O_3$) and heat treated at 900° C. ("XZO681/01" obtained from MEI, Flemington, N.J.) as the support. Samples 4, 5, 7-9 used a zirconium oxide powder ("FZO936" obtained from MEI, Flemington, N.J.) as the support. The substrate for all of the samples was a reticulated foam zirconia-toughened alumina (ZTA) substrate, 1" diameter by 1" high and having approximately 20 pores per linear inch (20 ppi). In each case, a portion of the mixture was dried, heat treated in air at about 90° C. for 30 minutes, then at about 120° C. for 30 minutes, followed by about 200° C. for 45 minutes, and finally at about 540° C. for 60 minutes, and the surface area, as well as the monoclinic and tetragonal relative heights, were measured.

TABLE 1

| Sample No. | Composition |
| --- | --- |
| 1 | zirconium oxide containing 6 wt % lanthanum oxide |
| 2 | Sample 1 heat treated to 900° C. |
| 3 | Sample 2 containing 10 wt % barium sulfate |
| 4 | pure zirconium oxide |
| 5 | zirconium oxide containing 8 wt % yttrium oxide |
| 6 | Sample 1 with zirconium oxide component pretreated to 1,200° C. |
| 7 | Sample 3 with zirconium oxide component pretreated to 1,200° C. |
| 8 | Sample 4 with zirconium oxide component pretreated to 1,200° C. |
| 9 | Sample 5 with zirconium oxide component pretreated to 1,200° C. |
| 10 | Sample 4 with severe accelerated aging, tested from 51.7 to 75 hours |
| Reference | alpha-aluminum oxide ($\alpha$-$Al_2O_3$) |

Sample 1 was prepared by mixing 450 grams (g) water, 63.38 g aqueous rhodium nitrate solution containing 8.60 wt % Rh, and 268 g of the zirconium hydroxide powder to form a mixture (i.e. the mixture tested for surface area and relative heights). This mixture was coated in two coating passes onto the substrate to give a total Rh loading on the finished part of 33.8 g Rh per cubic foot of substrate (g/ft$^3$). After each coating step, the part was heat treated in air at about 90° C. for 30 minutes, then at about 120° C. for 30 minutes, followed by about 200° C. for 45 minutes, and finally at about 540° C. for 60 minutes.

Sample 2 was prepared by mixing 470 g water, 50.70 g aqueous rhodium nitrate solution containing 9.29 wt % Rh, and 267 g of the zirconium hydroxide powder. The mixture was coated onto the substrate in two coating passes to give a total Rh loading on the finished part of 33.2 g Rh g/ft$^3$. After each coating step the part was heat treated in the same manner as Sample 1.

Sample 3 was prepared by mixing 470 g water, 59.90 g aqueous rhodium nitrate solution containing 10.03 wt % Rh, 27 g of barium sulfate, and 267 g of the zirconium hydroxide powder. The mixture was coated onto the substrate in three coating passes to give a total Rh loading on the finished part of 33.0 g Rh g/ft$^3$. After intermediate and final coating steps the part was heat treated in the same manner as Sample 1.

Sample 4 was prepared by mixing 452 g water, 65.30 g aqueous rhodium nitrate solution containing 8.60 wt % Rh, and 267.1 g of zirconium oxide powder. This mixture was coated onto the substrate in two coating passes, to give a total Rh loading on the finished part of 29.0 g Rh per cubic foot of substrate (g/ft$^3$). After intermediate and final coating steps the part was heat treated in the same manner as Sample 1.

Sample 5 was prepared by mixing 495 g water, 63.30 g aqueous rhodium nitrate solution containing 8.60 wt % Rh, 23.20 g of yttrium nitrate, and 267 g of the zirconium oxide powder. This mixture was coated onto the substrate in two coating passes, to give a total Rh loading on the finished part of 30.3 g Rh g/ft$^3$. After intermediate and final coating steps the part was heat treated in the same manner as Sample 1.

Sample 6 was prepared by the heat treating the zirconium hydroxide powder to 1,200° C. for 10 hours. The heat treated zirconium hydroxide powder (294.06 g) was then mixed with 545 g water, and 69.78 g aqueous rhodium nitrate solution containing 8.60 wt % Rh, and 23 g of nitric acid. This mixture was coated onto the substrate in three coating passes to give a total Rh loading on the finished part of 31.1 g Rh g/ft$^3$. After each coating step the part was heat treated in the same manner as Sample 1.

Sample 7 was prepared by the heat treating the zirconium hydroxide powder to 1,200° C. for 10 hours. The heat treated zirconium hydroxide powder (294.06 g) was then mixed with 517 g water, and 69.79 g aqueous rhodium nitrate solution containing 8.60 wt % Rh, 23 g of nitric acid. This mixture was coated onto a substrate in three coating passes to give a total Rh loading on the finished part of 30.9 g Rh g/ft$^3$. After intermediate and final coating steps the part was heat treated in the same manner as Sample 1.

Sample 8 prepared by the heat treating the zirconium oxide powder to 1,200° C. for 10 hours. The heat treated zirconium oxide powder (294.1 g) was then mixed with 485 g water, and 69.80 g aqueous rhodium nitrate solution containing 8.60 wt % Rh. This mixture was coated onto the substrate in two coating passes to give a total Rh loading on the finished part of 29.9 g Rh g/ft$^3$. After intermediate and final coating steps the part was heat treated in the same manner as Sample 1.

Sample 9 prepared by the heat treating the zirconium oxide powder to 1,200° C. for 10 hours. The heat treated zirconium oxide powder (218.4 g) was then mixed with 485 g water, and 51.70 g aqueous rhodium nitrate solution containing 8.60 wt % Rh. This mixture was coated onto the substrate in three coating passes to give a total Rh loading on the finished part of 30.2 g Rh g/ft$^3$. After intermediate and final coating steps the part was heat treated in the same manner as Sample 1.

Reference was prepared by mixing 400 g water, 300 g of alumina powder, and 33 grams of barium sulfate. This mixture was heated at about 100° C., with mixing, until dry, and then heated to 1,200° C. in air for 10 hours. 243.7 g of this powder was mixed with 480 g water and 58.10 g of aqueous rhodium nitrate solution containing 8.60 wt % Rh. This mixture was coated onto the substrate in two coating passes to give a total Rh loading on the finished part of 35.2 g Rh per cubic foot of substrate (g/ft³). After intermediate and final coating steps the part was heat treated in the same manner as Sample 1.

Samples 1 through 9 and the Reference were evaluated for changes in $H_2$ and CO selectivity for partial oxidation of a hydrocarbon fuel. The Samples and the Reference were contained in a steel tube fixtures and preheated to about 300° C. A mixture of fuel (i.e., having a composition of about 84.2 wt % carbon, 13.8 wt % hydrogen, and 2.0 wt % oxygen) and air was then introduced thereto. The fuel and air were mixed at a total oxygen to total carbon ratio of about 1.04-1.05, except for one test at 1.10, on an atomic ratio basis. The reaction was conducted at a fuel flow rate of 2.3 grams per second (g/s) and a reaction temperature (measured at the axial and radial center of the samples) of about 1,050° C. Gaseous reaction products were analyzed by gas chromatography. The deactivation rate, or change in selectivity, was measured as the difference between the hydrogen or carbon monoxide concentration measured after 2 hours of testing and again after 20 hours of testing.

Following partial oxidation testing of Sample 4, for 50 hours at an O/C of 1.05, fuel flow rate was maintained and the air flow rate was adjusted to give an O/C of 1.14, resulting in an increase in the reaction temperature to 1,160° C., and thus increasing the thermal stress on the sample. This subsequent test is referred to as Sample 10. The deactivation rate of Sample 10 was determined by measuring the hydrogen and carbon monoxide concentrations in the product gas at 52 hours and again at 74 hours, referenced from the start of the test when O/C was 1.04.

yttrium, as can be seen from the XRD for the monoclinic phase (M) and the tetragonal phase (T). Where the zirconia was stabilized, e.g., Sample 3, the zirconia was mostly in the tetragonal phase (3034; versus the monoclinic phase 104), yet it had a very low morphology parameter (less than 2), and a high change in hydrogen selectivity (greater than −1.5). As is clear from Table 2, the effectiveness of the catalyst relates to the morphology parameter and not merely surface area.

TABLE 3

| Sample No. | Deactivation rate (% change in concentration per 1,000 min) | |
|---|---|---|
| | $H_2$ | CO |
| Reference | 0.485 | 0.198 |
| 4 | 0.243 | 0.034 |
| 5 | 0.178 | −0.032 |
| 10 | 0.389 | 0.208 |

As can be seen from Table 3, the reference deactivates (change in hydrogen concentration over 1,000 minutes) nearly twice as fast as Sample 4. Sample 10, although having been severely aged, still exhibits a deactivation rate of less than that of the reference. The Samples with the desired morphology parameters deactivated substantially slower.

Not to be limited by theory, certain average pore size ranges of the zirconium oxide material, either before of after heat treatments, may be advantageous. For example, some applications may have improved benefits by employing a

TABLE 2

| No | pH | Surface Area (m²/g) | MRH[1] at ~28.2° | TRH[2] at ~30.2° | Phase Ratio (M/T)[3] | [4]ΔH₂ | Morphology Parameter[5] | Rh (g/ft³) | O/C[6] |
|---|---|---|---|---|---|---|---|---|---|
| 1 | 4.9 | 301.3 | N.D. | 171 | 0 | −1.12 | 0 | 34 | 1.04 |
| 2 | 2.8 | 38.2 | 104* | 3034 | 0.034 | −0.57 | 1.31 | 33 | 1.10 |
| 3 | 2.4 | 38.2[7] | 104[7] | 3034 | 0.034 | −1.74 | 1.31 | 33 | 1.04 |
| 4 | 2.5 | 100.8 | 1261 | 91* | 13.86 | −0.16 | 1396.80 | 29 | 1.05 |
| 5 | 1.9 | 67.3 | 1169 | 87* | 13.44 | −0.16 | 904.30 | 30 | 1.05 |
| 6 | 0.6 | 1.3 | 1990 | 201 | 9.90 | −1.15 | 13.17 | 31 | 1.04 |
| 7 | 0.5 | 0.2 | 2080 | 195 | 10.67 | −1.67 | 2.13 | 31 | 1.04 |
| 8 | 1.5 | 2.1 | 7543 | 59* | 128 | −0.47 | 268.48 | 30 | 1.05 |
| 9 | 1.7 | 2.8 | 4020 | 650* | 6.18 | −1.13 | 17.32 | 30 | 1.04 |

[1]MRH is the monoclinic relative height
[2]TRH is the tetragonal relative height
[3]phase ratio is the relative height of the ~28.2° monoclinic $ZrO_2$ to the ~30.2°
[4]$\Delta H_2$ is the change in hydrogen selectivity (%/1,000 minutes)
[5]morphology parameter = (surface area) * (phase ratio)
[6]O/C is in mol/mol
[7]projected
*baseline corrected for overlap by very broad adjacent peaks As can be seen from Table 2, Sample 4 (having a morphology parameter of greater than about 1,300) and Sample 5 (having a morphology parameter of greater than about 900), both had a very low change in hydrogen selectivity (e.g., —0.16); i.e., a 70% less change than Sample 1. Additionally, Sample 1, which had the highest surface area, also had a high change in hydrogen selectivity. Not to be limited by theory, it further appears that the pH of the aqueous mixtures used in the coating the substrates contributes to the stability and morphology parameter. Desirably, the pH can be adjusted to less than about 3, or, more specifically, about 1 to about 3, or, even more specifically, about 1.5 to about 2.5.

It is also noted that, in Sample 5, the zirconia was not stabilized with the yttria, it was merely mixed with the material with average pore diameters of 5 nm to 50 nm, or, more specifically, of 7 nm to 15 nm, while other applications may benefit from smaller average pore diameters, such as 1 nm to 20 nm, or, more specifically 4 nm to 10 nm.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for making a catalyst, comprising:
combining rhodium and zirconia, to form a mixture wherein the zirconia has a morphology parameter of greater than or equal to about 800, wherein the zirconia comprises a phase ratio of monoclinic phase to tetragonal phase of greater than or equal to about 10,
wherein the mixture has a pH of less than or equal to about 3, and disposing the mixture onto a substrate.

2. The method of claim 1, wherein the pH is about 1 to about 3.

3. The method of claim 2, wherein the pH is about 1.5 to about 2.5.

4. The method of claim 1, wherein the morphology parameter is greater than or equal to about 900.

5. The method of claim 4, wherein the morphology parameter is greater than or equal to about 1,100.

6. The method of claim 1, wherein disposing the mixture onto the substrate further comprises disposing the mixture in more than one coating pass with a heat treatment between each coating pass.

7. The method of claim 6, wherein the heat treatment further comprises treating at about 75° C. to about 230° C. for about 10 minutes to about 180 minutes, and treating at about 500° C. to about 600° C. for about 45 minutes to about 90 minutes.

8. The method of claim 7, wherein treating at about 75° C. to about 230° C. further comprises treating at about 75° C. to about 100° C. for about 10 minutes to about 60 minutes, at about 110° C. to about 130° C. for about 10 minutes to about 60 minutes, and at about 175° C. to about 220° C. for about 30 minutes to about 60 minutes.

* * * * *